United States Patent
Li et al.

(10) Patent No.: US 11,997,393 B2
(45) Date of Patent: May 28, 2024

(54) METHOD FOR AUTOMATICALLY ADJUSTING ILLUMINATION LEVEL OF TARGET SCENE AND SMART ILLUMINATION CONTROL SYSTEM

(71) Applicant: ANDON HEALTH CO., LTD., Tianjin (CN)

(72) Inventors: Qin Li, Tianjin (CN); Yang Guo, Tianjin (CN); Fei Zhang, Tianjin (CN); Jinjin Li, Tianjin (CN)

(73) Assignee: ANDON HEALTH CO., LTD., Tianjin (CN)

( * ) Notice: Subject to any disclaimer, the term of this patent is extended or adjusted under 35 U.S.C. 154(b) by 16 days.

(21) Appl. No.: 17/603,952

(22) PCT Filed: Jun. 8, 2020

(86) PCT No.: PCT/CN2020/094916
§ 371 (c)(1),
(2) Date: Oct. 15, 2021

(87) PCT Pub. No.: WO2021/098191
PCT Pub. Date: May 27, 2021

(65) Prior Publication Data
US 2022/0201180 A1      Jun. 23, 2022

(30) Foreign Application Priority Data

Nov. 21, 2019 (CN) .......................... 201911150829.9

(51) Int. Cl.
*H04N 23/71* (2023.01)
*H04N 23/74* (2023.01)

(52) U.S. Cl.
CPC ............. *H04N 23/71* (2023.01); *H04N 23/74* (2023.01)

(58) Field of Classification Search
CPC ........ H04N 23/71; H04N 23/74; H04N 23/70; H04N 23/72
See application file for complete search history.

(56) References Cited

U.S. PATENT DOCUMENTS 11,032,482 B2 * 6/2021 Tangeland ........... H04N 23/611
2016/0373633 A1 * 12/2016 Grauer ..................... G03B 7/16
(Continued)

FOREIGN PATENT DOCUMENTS

| CN | 104113744 A | 10/2014 |
| CN | 106713760 A | 5/2017 |

(Continued)

*Primary Examiner* — Luong T Nguyen
(74) *Attorney, Agent, or Firm* — Bayramoglu Law Offices LLC (57) ABSTRACT

A method for calculating a current illumination level of a target scene capable of quantitatively evaluating an illumination level in a scene through a camera, and a method for automatically adjusting an illumination level of the target scene capable of automatically performing a constant light control over a scene, and a camera, capable of quantitatively evaluating the illumination level in the scene and a smart illumination control system are provided. The smart illumination control system is capable of quantitatively evaluating the illumination level in the scene and automatically adjusting an illumination brightness, a color temperature, a color or a contrast in the scene to realize a constant control over a light environment. In addition, by setting the illumination level on a setting terminal, an illumination product also performs a light-supplementing automatically for the camera to realize a constant light control over a shooting.

7 Claims, 3 Drawing Sheets

(56) References Cited

U.S. PATENT DOCUMENTS

| | | | | |
|---|---|---|---|---|
| 2018/0352131 A1* | 12/2018 | Andorko | | H04N 23/76 |
| 2019/0172420 A1* | 6/2019 | Ke | | H04N 23/71 |
| 2020/0092968 A1* | 3/2020 | Sun | | H05B 45/20 |

FOREIGN PATENT DOCUMENTS

| | | |
|---|---|---|
| CN | 108650455 A | 10/2018 |
| CN | 109466436 A | 3/2019 |
| CN | 110769164 A | 2/2020 |

\* cited by examiner

METHOD FOR AUTOMATICALLY ADJUSTING ILLUMINATION LEVEL OF TARGET SCENE AND SMART ILLUMINATION CONTROL SYSTEM

CROSS REFERENCE TO RELATED APPLICATIONS

This application is the national stage entry of International Application No. PCT/CN2020/094916, filed on Jun. 8, 2020, which is based upon and claims priority to Chinese Patent Application No. 201911150829.9 filed on Nov. 21, 2019, the entire contents of which are incorporated herein by reference.

TECHNICAL FIELD

The present invention relates to the field of smart illumination control and in particular relates to a method for automatically adjusting an illumination level of a target scene and a smart illumination control system.

BACKGROUND

With the development of wireless communication techniques in the recent years, the Internet of Things gradually interconnects and intercommunicates various information sensing devices, which also enables significant development of the smart illumination field. Perception in a scene can be realized and associated with a lamp through a light sensor, an infrared sensor and other various sensor techniques, thus realizing smart control over an illumination device. By interaction with a mobile phone, many smart illumination products are equipped with such functions as adjusting light brightness, adjusting a color temperature, adjusting a color, soft-starting light, timing control and scene setting.

However, the current smart illumination product generally still needs participation of people in illumination adjustment, as they either do not possess a following function varying with an illumination environment or need participation of such auxiliary sensors like a light sensor or an infrared sensor. Moreover, these sensors are also generally restricted to a certain local range, resulting in limited perceiving contents and range, such that smart illumination control over a large scene range similar with a whole house cannot be realized. Meanwhile, the light sensor is weak in anti-interference level to environment. When it is disturbed by an activity of a person, an animal and the like, identification cannot be made, thus generating disturbance to a light perceiving signal, which is easy to cause misjudgment.

SUMMARY

One objective of the present invention is to provide a method for calculating a current illumination level of a target scene, which is capable of quantitatively evaluating an illumination level in a scene through a camera;

Another objective of the present invention is to provide a method for automatically adjusting an illumination level of a target scene, which is capable of automatically performing constant light control over a scene;

Another further objective of the present invention is to provide a camera, which is capable of quantitatively evaluating an illumination level in a scene;

Again another further objective of the present invention is to provide a smart illumination control system, which is capable of quantitatively evaluating an illumination level in a scene and automatically adjusting an illumination brightness (illuminance), a color temperature, a color or a contrast in the scene, thereby realizing constant control over light environment.

In this regard, the technical solution of the present invention is as follows:
a method for calculating a current illumination level of a target scene, the method comprising the following steps:
S1: in a standard light metering environment, given a different standard illumination level value $A_i$ of a camera, obtaining an image perceiving illumination level $B_i$ of the camera under a different exposure parameter $M_i$ condition, thereby forming a light meter TB of the camera: $A_i \cdot M_i / B_i$, wherein $i=1, 2, 3, \ldots, n$;
S2: storing the light meter TB in the camera, an illumination product or a setting terminal for linkage to the camera;
S3: obtaining an exposure parameter of a current image of the target scene and calculating an image perceiving illumination level B of the current image; and
S4: bringing, by the camera, the exposure parameter of the current image in the step S3 and the obtained image illumination level B of the current image into the light meter TB, thereby obtaining a current illumination level of the target scene.

The calculating an image perceiving illumination level B of the current image of the target scene in the step S3 comprises the following steps:
1) shooting the target scene by the camera, thereby obtaining a current image under a current exposure parameter; and
2) processing the current image by the camera through image anti-interference processing and an image processing algorithm, thereby obtaining an image perceiving illumination level B of the current image, wherein the image anti-interference processing comprises processing on effect of a reflective light source within the target scene and anti-interference processing on various noise.

The exposure parameter comprises a shutter T and an aperture F; and the illumination level comprises one or more of a brightness, a color temperature, a color and a contrast. The preferable illumination level is a brightness.

Since a distance between a camera and a target scene also impacts a calculating result, preferably, the parameter in the light meter further comprises a distance between the camera and the target scene.

A method for automatically adjusting an illumination level of a target scene, comprises the following steps:
(1) setting a target scene and associating it with a corresponding illumination product;
(2) setting a target illumination level of the target scene;
(3) calculating a current illumination level of the target scene according to the method described above;
(4) according to a deviation between the current illumination level obtained in the step (3) and the target illumination level obtained in the step (2), adjusting an illumination product impacting an illumination level in the target scene; and
(5) repeating the steps (3) and (4) till the target scene reaches the target illumination level.

Wherein the target scene in the step (1) is set through the following method:
shooting an image in a scene by the camera, receiving and displaying the image through one setting terminal, specifying a target scene by a user through the setting terminal and transmitting a position parameter of the target scene to the camera in a wired or wireless manner, and calculating a region range of the target scene by the camera according to the received position parameter.

In the step (2), a target illumination level of a target scene is set through self-defined calculation of a system and/or through self-defining of a user. The method of setting a target illumination level for the target scene by the self-defining of a user involves defining a target illumination level by a user through the setting terminal with a scene interaction setting function or inputting a target illumination level parameter value through the setting terminal.

The scene interaction setting function involves adjusting an illumination level in a target scene by a user through natural light or adjustment of an illumination product, and observing an illumination level in a target scene by a user, wherein when the illumination level in the target scene reaches an expected level of the user, the user confirms a current illumination level at the setting terminal, and the setting terminal records the current illumination level as a target illumination level.

After a target illumination level of a target scene is set in the step (2), the target illumination level of the target scene is further adjusted through another camera associated with the system, which comprises the following steps:
  a) shooting a reference light environment by the another camera and calculating a current illumination level of the reference light environment according to "a method for calculating a current illumination level of a target scene" described above; and
  b) adjusting a target illumination of a target scene according to the current illumination level of the reference light environment obtained in the step a).

A camera comprises a camera body, inside which a camera module, an exposure parameter obtaining module, a storage unit module, a smart control module, a target illumination level module, an illumination level calculation module, an illumination product connection module and a setting terminal connection module are provided, wherein the camera module is used to intermittently or continuously shoot and monitor a target scene, thereby obtaining a current image; the exposure parameter obtaining module is used to obtain an exposure parameter of the current image; the storage unit module is used to store the light meter and the set target illumination level; the setting terminal connection module is used to receive control information of the smart control module and connect and transmit data wiredly or wirelessly to the setting terminal, the data comprising a position parameter of the target scene and a target illumination level setting parameter; the target illumination level module obtains a target illumination level according to the target illumination level setting parameter received by the setting terminal connection module, and according to the method described above; the illumination level calculation module is used to acquire a region range of a target scene from the smart control module, calculate an image perceiving illumination level within the region range of the target scene for the current image collected by the camera module, and calculate a current illumination level of a target scene for the image collected by the camera module through "the light meter" stored in "the storage unit module" by combining or not combining the exposure parameter of "the exposure parameter obtaining module"; the smart control module is used to:
  1) calculate a region range of a target scene according to the position parameter of the target scene received by the setting terminal connection module and the current image collected by the camera module;
  2) store the target illumination level obtained by the target illumination level module in the storage unit module; and
  3) according to the current illumination level of the target scene obtained by the illumination level calculation module and the target illumination level stored in the storage unit module, calculate a deviation between the current illumination level and the target illumination level; increase a control parameter of an illumination level when the current illumination level is lower than the target illumination level; and decrease the control parameter of the illumination level and transmit the control parameter to the illumination product through the illumination product connection module when the current illumination level is higher than the target illumination level; and
the illumination product connection module is used to receive control information of the smart control module, and connect and transmit data wiredly or wirelessly to the illumination product.

Preferably, the camera further comprises a multi-camera connection module, the multi-camera connection module being used to receive the control information of the smart control module, and connect and transmit data wiredly or wirelessly to other camera and transmit the illumination level of the reference light environment obtained by the other camera to the target illumination level module for participating in adjustment of the target illumination level.

A smart illumination control system comprises an illumination product, a setting terminal and the camera described above, wherein the camera and the illumination product are connected in a wired or wireless manner to evaluate a current illumination level of a target scene and automatically adjust an illumination level of an illumination product in the target scene according to a deviation between the current illumination level and the target illumination level; and the setting terminal is used to set one or more target scenes, associate each target scene with one or more illumination products and set the target illumination level.

Wherein the camera, the illumination product and the setting terminal are connected in a wired or wireless manner, the wireless manner comprising BlueTooth, Zigbee, wifi or Sub-1G. When the camera, the illumination product and the setting terminal are connected in a different wireless manner, data format conversion and connection are performed through a gateway. The setting terminal can be a mobile phone, a tablet PC, a palm computer, a desktop computer, a smart television, a smart set top box or a visible digital speaker.

In addition, a target illumination level is set at the setting terminal, such that an illumination level is further adjusted through the illumination product, in which case the camera can be light-supplemented automatically, thereby realizing constant light control over the shooting of the camera.

The present invention has the following advantageous effects:
  the method for calculating a current illumination level of a target scene in the present invention is capable of quantitatively evaluating an illumination level in a scene through a camera. Compared with an existing method by employing a light sensor or an infrared sensor, the method realizes larger contents and scope of brightness (illuminance) perception and better anti-interference ability to environment. When disturbed by an activity of a person, an animal and the like, the camera can remove interference automatically through image identification, such that the method is more suitable for evaluation of illuminance and application of a smart illumination control for a whole house and other large-scene range, home or business environment. Such method can also be applied to evaluation on an illumination color temperature, a color and a contrast in a scene and application of smart illumination control.

The method for automatically adjusting an illumination level of a target scene in the present invention enables an illumination brightness (illuminance), a color temperature, a color or a contrast in a scene not to be impacted by a change in sunlight or other illumination environment, in which case manual intervention is not required, as constant light control over a scene is performed automatically. The method is capable of identifying interference of a person, an animal and the like through an image algorithm of a camera, thereby acquiring a current illumination level quantitatively and more accurately. The method can also automatically set an energy-conserving, comfortable, and healthy illumination level and perform constant control for different scenes such as a study, a restaurant, a dinning room, a bedroom and the like through a scene identification algorithm of a camera, Or the method sets the illumination level according to a brightness, a color temperature and the like that a user likes for constant control.

The camera of the present invention is capable of quantitatively evaluating an illumination level in a scene. The camera is capable of quantitatively evaluating a brightness (illuminance), a color temperature, a color or a contrast in a scene and linking to a smart illumination product and a setting terminal, and can also link mutually between cameras, such that it can be used for smart illumination control or constant control of the illumination level.

The smart illumination control system of the present invention is capable of quantitatively evaluating an illumination level in a scene and automatically adjusting an illumination brightness (illuminance), a color temperature, a color or a contrast in a scene, thereby realizing constant control over light environment. The system is capable of automatically identifying a scene and automatically setting a proper illumination level according to a different scene and performing constant light control. Constant light control can also be performed according to self-defined illumination level setting of the user. Meanwhile, by setting an illumination level on a setting terminal, the illumination product can perform light-supplementing automatically for the camera, thereby realizing constant light control over the shooting.

DETAILED DESCRIPTION OF THE EMBODIMENTS

The following describes technical solutions of the present invention in detail with reference to the accompanying drawings and embodiments. The following concepts are used in the present invention:

An illumination level comprises one or more of a brightness, a color temperature, a color and a contrast;

An image perceiving illumination level refers to an illumination level of an image collected by a camera;

A target illumination level refers to an illumination level to which a target scene desires to reach; and A target brightness refers to a brightness (illuminance) to which a target scene desires to reach.

The method for calculating a current illumination level of a target scene in the present invention comprises the following steps:

S1: in a standard light metering environment, given a different standard illumination level value $A_i$ of a camera, obtaining an image perceiving illumination level $B_i$ of the camera under a different exposure parameter $M_i$ condition, thereby forming a light meter TB of the camera: $A_i$-$M_i$/$B_i$, wherein i=1, 2, 3, . . . , n;

S2: storing the light meter TB in the camera, an illumination product or a setting terminal for linkage to the camera;

S3: obtaining an exposure parameter of a current image of the target scene and calculating an image perceiving illumination level B of the current image; and S4: bringing, by the camera, the current exposure parameter in the step S3 and the obtained current image illumination level B into the light meter TB, thereby obtaining a current illumination level of the target scene.

Wherein the calculating an image perceiving illumination level B of the current image of the target scene in the step S3 comprises the following steps:

1) shooting the target scene by the camera, thereby obtaining a current image under a current exposure parameter; and 2) processing the current image by the camera through image anti-interference processing and an image processing algorithm, thereby obtaining an image perceiving illumination level B of the current image. The image anti-interference processing comprises processing on effect of a reflective light source within the target scene and anti-interference processing on various noise.

Since in an actual application a distance between a camera and a target scene differs, thus the parameter in the light meter further comprises a distance between the camera and the target scene.

The exposure parameter $M_i$ comprises a shutter T and an aperture F and/or a gain S, preferably a shutter T and an aperture F. The illumination level can be one or more of a brightness, a color temperature, a color and a contrast, generally comprising a brightness.

The following describes the above method for calculating a current illumination level of a target scene with a current brightness of a target scene as an example.

Figure 1:
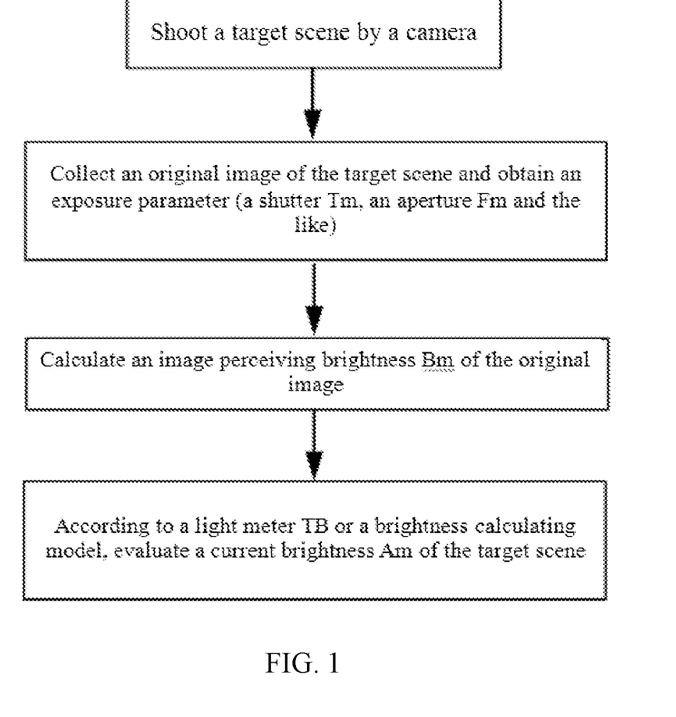
FIG. 1 is a flow chart a method for calculating a current brightness in a target scene in one embodiment of the present invention.

Referring to FIG. 1, firstly, a camera shoots a target scene, collects an original image in the target scene and obtains a reasonable exposure parameter (a shutter T, an aperture F and a gain S etc.) through automatic exposure. An image is conducted to an optical lens through a colored CCD or CMOS sensing apparatus. Then, an output signal of the sensing apparatus is adjusted through automatic gain control (AGC)/correlated dual sampler (CDS), to maintain stability of an output level. A digital processing chip outputs a related focusing signal, a brightness value and a RGB color component to serve for subsequent auto-focusing, auto-exposure and auto-white balance sub-system. Auto-exposure: through an auto-exposure algorithm, automatically obtaining a reasonable exposure parameter (a shutter T, an aperture F, a gain S and the like) for a target scene.

Then according to an original image of a target region collected and the exposure parameter, a brightness of a target scene is evaluated. Principles for calculating a brightness of a target scene are as follows:

A camera presents a linear relationship between a grayscale D of a digital image and a logarithmic of an exposure amount 1 gH:

$$D = v \lg H + m \qquad (1)$$

wherein: H=ET
T: an exposure time;
E: an illuminance of a camera;
m: an intercept of a linear section of a light perceiving feature curve; and
v: a contrast coefficient, i.e. a slope of a straight-line section of a light perceiving feature curve.

Figure 2:
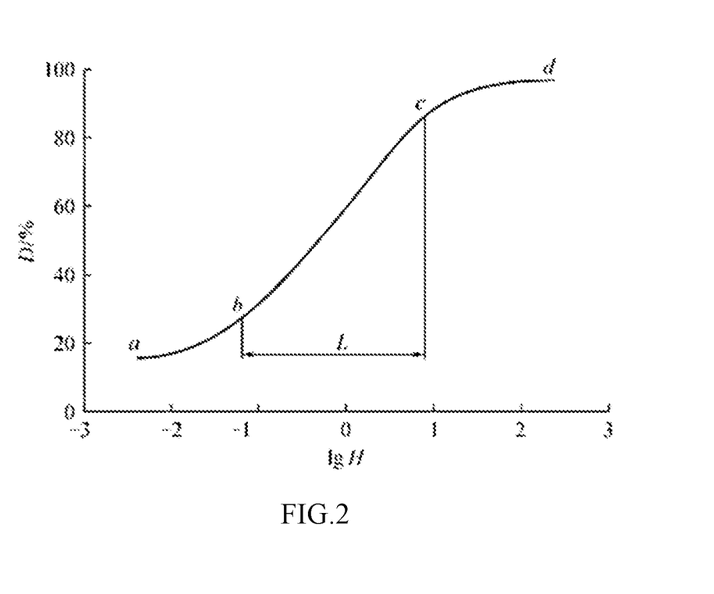
FIG. 2 is a light perceiving feature curve.

Referring to the light perceiving feature curve shown in FIG. 2, a vertical coordinate D denotes grayscale of a digital image and a horizontal coordinate denotes a logarithmic value 1 gH of an exposure amount H.

The formula for an illuminance of a CMOS sensor area array is as follows:

$$E = \pi A \tau / 4F^2 (1 - f/l) \qquad (2)$$

wherein:
A is a brightness;
F is an aperture;
$\tau$ is a transmission coefficient of a camera, generally $\tau$=1.27;
l is a lens focus, i.e. a distance between a camera lens and a target; and
f is a transmissivity of a camera lens, and when a measured target is of far distance, f/l is negligible.

Formula (2) can be simplified as $E = \pi A \tau / 4F^2$, and brought into formula (1), thereby obtaining:

$$H = \pi A \tau T / 4F^2, D = v \lg \pi \tau T A / 4F^2 + m$$

Generally $\tau$=1.27, thus $4/\pi\tau \approx 1$
A brightness calculating formula is:

$$A = F^2 / T 10^{D-m/v}$$

wherein:
A is a brightness, F is an aperture, T is an exposure time (a shutter), D is a grayscale of an image of a camera at an imaging section, and an average grayscale of an image of a target scene is an image perceiving brightness B; m is an intercept of a linear section of a light perceiving feature curve, and v is a contrast coefficient, i.e. a slope of a straight-line section of a light perceiving feature curve.

Therefore, brightness calculating of the target scene relates to a shutter T, an aperture F, an image perceiving brightness B and a light perceiving feature curve of a camera etc. When a distance between a camera and a target scene is close, and a distance L between a camera and a target scene is related to, a brightness A calculated with a different distance differs.

Then, the light meter TB of a camera is calibrated: calibrating work is performed at a developing stage of a camera. According to features of a camera (a light perceiving feature curve), a light meter TB is calibrated for the camera.

When a different standard brightness Ai is given for the camera, an image perceiving brightness B under a different shutter T and an different aperture F of the camera is obtained, thereby forming a light meter TB of the camera: A-T/F/B. Impacting parameters like a distance L can also be considered in the light meter.

$$TB: A - T/F/B$$

| Standard brightness A | Shutter T | Aperture F | Image perceiving brightness B | ... (For example, Distance L) |
|---|---|---|---|---|
| $A_1$ | $T_1$ | $F_1$ | $B_1$ | ... |
| $A_2$ | $T_2$ | $F_2$ | $B_2$ | ... |
| ... | ... | ... | ... | ... |

The table can also be mathematically modeled through a linear or non-linear mathematical tool, such as building a brightness calculating model with step autoregression, neural network and the like.

$$A = a1T + a2F + a3B + \ldots$$

wherein, a1, a2 and a3 are variable parameters of a brightness calculating model.

With a camera aperture of 1.7 and a distance 5 m between a camera and a target scene as an example:

| Standard brightness A | Shutter T | Aperture F | Distance L | Image perceiving brightness B |
|---|---|---|---|---|
| 200 | 50 | 1.7 | 5 | 80 |
| 230 | 50 | 1.7 | 5 | 105 |
| 250 | 60 | 1.7 | 5 | 53 |
| 300 | 60 | 1.7 | 5 | 93 |
| 1000 | 200 | 1.7 | 5 | 161 |
| 2500 | 500 | 1.7 | 5 | 192 |
| 3000 | 600 | 1.7 | 5 | 212 |
| 5000 | 1000 | 1.7 | 5 | 227 |
| ... | ... | ... | ... | ... | formula $A = 4.953*T + 0.49*B - 69.088$ is generated, wherein:
A: a standard brightness (illuminance), with a unit of 1x;
T: a shutter, with a unit of 1/s;
B: an image perceiving brightness normalized to 0-255; and
L: an average distance between a camera and a target scene, with a unit of m.

Afterward, the light meter TB is stored in the camera, an illumination product or a setting terminal for linkage to the camera;

and then a current image perceiving brightness Bm of a target scene is calculated and a current brightness Am of a target scene is evaluated:

calculating an image perceiving brightness Bm of a current target scene of a camera. Upon calculating a current image perceiving brightness Bm, it is necessary to process various anti-interference factors, specifically as follows:

for windows, lamps (interfering light sources) or other reflective light sources or other highlighting light sources within a target scene, effects of highlighting light sources can be avoided through image algorithm processing. In addition, various noises in the image are processed for anti-interference.

Anti-interference-processed current image perceiving brightness Bm and a current shutter Tm and aperture Fm parameters are brought into the light meter TB or the brightness calculating model for evaluating the current brightness Am of the current target scene.

The method for automatically adjusting an illumination level of a target scene in the present invention comprises the following steps:

(1) setting a target scene and associating it with a corresponding illumination product;

wherein the target scene is a region of interest of human eyes and it can be set as an overall scene and a local scene can be specified as a target scene through a mobile phone and other setting terminals. In addition, a user can set one or more target scenes. The process for the user to set the target scene involves: 1) shooting an image in a scene by the camera, receiving and displaying the image in the scene through one setting terminal, 2) specifying a target scene by a user through the setting terminal and transmitting a position parameter of the target scene to the camera in a wired or wireless manner, and 3) calculating a region range of the target scene by the camera according to the received position parameter set by the user for subsequent calculation of the illumination level.

For a fixed-placed camera, a shooting scene of the camera should comprise a target scene. The fixed-placed camera should be equipped with a function for automatically identifying and matching a deviation of a target scene to prevent deviation of the target scene in a viewing window caused by movement of the camera's position. For a rotatable camera with pan&tilt, the camera tracks and locks a region range of a user-defined target scene. The camera can lock the target scene according to a pan&tilt angle coordinate of the user-defined target scene and a pixel region in an image; and can also track detection of the target scene through a region tracking method in the scene based on the image collected by the camera according to the user-defined target scene. Other methods for positioning the user-defined target scene can also be utilized.

After the target scene is determined, the target scene is associated with one or more illumination products through the setting terminal.

(2) setting a target illumination level of the target scene;

wherein the target illumination level comprises a target brightness, a target color temperature, a target color and a target contrast etc. A target illumination level can be set through self-defined calculation of a system and/or through self-defining of a user.

The method of setting a target illumination level for the target scene by the self-defining of a user involves defining a target illumination level by a user through the setting terminal with a scene interaction setting function or inputting a target illumination level parameter through the setting terminal. The scene interaction setting function involves adjusting an illumination level in a target scene by a user through natural light or adjustment of an illumination product, and observing an illumination level in a target scene by a user, wherein when the illumination level in the target scene reaches an expected level of the user, the user confirms a current illumination level at the setting terminal, and the setting terminal records the current illumination level as a target illumination level.

The target brightness of the user-defined target scene is taken as the example for description below:

The target brightness of the target scene can be the target brightness defaulted by the system (calculated through a target brightness model defaulted by the system) and can also be individually defined by the user. When the target brightness model defaulted by the system is used, a different optimal target brightness can be given according to a different target scene so as to ensure better energy conservation while ensuring comfort and health of human eyes. The different target scene can be a kitchen, a dinning table, a living room and a desk etc. and the target brightness can be defined according to the different target scene. The target brightness model can also use a time parameter of the system or an outdoor sunlight level parameter. The target brightness level can also be set as a maximum brightness and an average brightness of the target scene etc. in a certain time through information like system time and illumination level memory.

When the user individually defines the target brightness, the user can specify a target brightness by inputting parameters through the setting terminal.

The user can also adjust a brightness in a target scene by natural light or adjustment of lamps and other illumination products. When the brightness in the target scene reaches a target brightness of the user, the current brightness in the target scene collected by the camera is configured on the setting terminal and the brightness in the scene at this time is regarded as a target brightness. The target brightness can also be set as a maximum brightness and an average brightness of a target scene etc. in a day.

Preferably, after a target illumination brightness of a target scene is set, the target brightness of the target scene is further adjusted through another camera associated with the system, which specifically comprises the following steps: a) shooting a reference light environment by the another camera, wherein the reference light environment is a light environment for impacting an illumination level of a target scene, such as an outdoor sunlight brightness, and calculating a current brightness of the reference light environment according to the method described above; and b) adjusting a target brightness of a target scene according to the current brightness of the reference light environment obtained in the step a).

(3) calculating a current illumination level of the target scene according to the method described above;

(4) according to a deviation between the current illumination level obtained in the step (3) and the target illumination level obtained in the step (2), adjusting an illumination product impacting an illumination level in the target scene; and (5) repeating the steps (3) and (4) till the target scene reaches the target illumination level.

Figure 3:
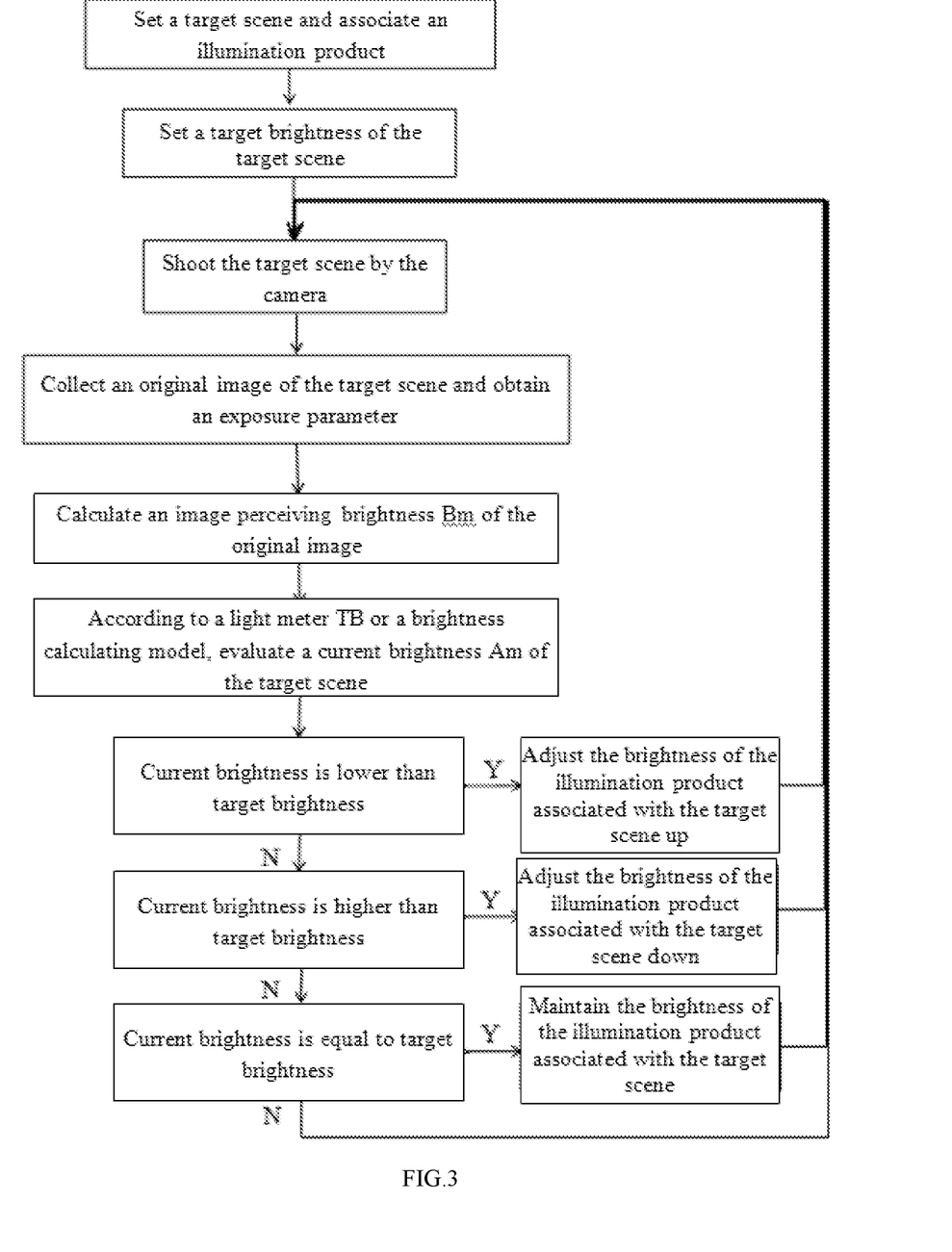
FIG. 3 is a flow chart a method for automatically adjusting a target scene brightness in one embodiment of the present invention.

Referring to FIG. 3, the following description is made with the process of automatically adjusting a brightness of a target scene as an example:

After completing steps of setting the target scene, associating the illumination product and setting the target brightness, the camera continuously shoots the target scene, thereby obtaining an original image and an exposure parameter (a shutter T, an aperture F, a gain S and the like) of the target scene. An image perceiving brightness Bm of the original image is calculated. According to the light meter TB or a brightness calculating model and the method described above, the current brightness Am of the target scene is calculated.

A deviation between the current brightness and the target brightness is calculated and according to the deviation, an online illumination product impacting a brightness of the target scene is adjusted. If the current brightness of the target scene is lower than the target brightness, the brightness of the illumination product associated with the target scene is adjusted up. If the current brightness is higher than the target brightness, the brightness of the illumination product associated with the target scene is adjusted down. If the current brightness is equal to the target brightness, the brightness of the associated illumination product is maintained.

The brightness of the target scene in the above method is replaced by a color temperature or a color or other parameters for automatically adjusting the color temperature and the color of the target scene. The brightness of the target scene in the above method is replaced by a contrast or other parameters for automatically adjusting the contrast of the brightness of the target scene to prevent a contrast of a dark region from being too large, in which case visual fatigue is generated for human eyes.

Figure 4:
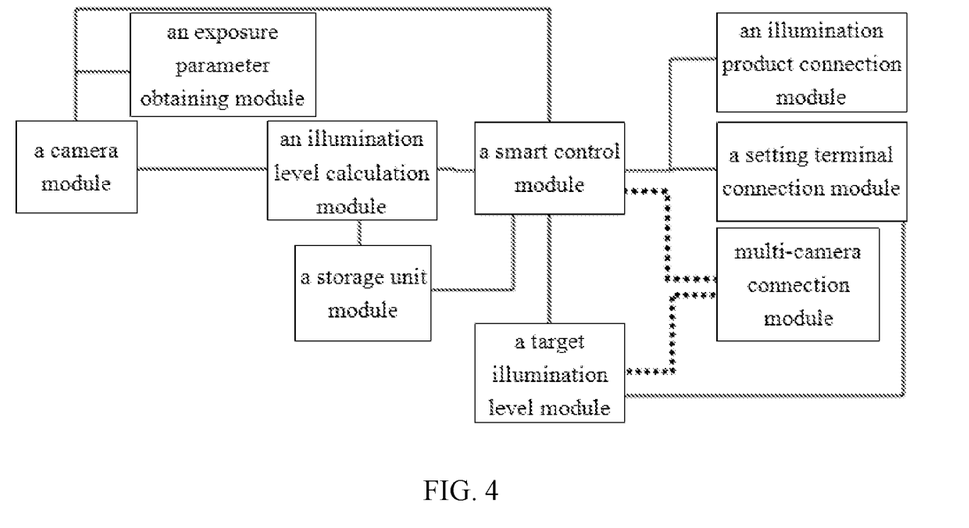
FIG. 4 is a structural block diagram of a camera in the present invention.

The present invention also protects a camera, as shown in FIG. 4, the camera comprising a camera body, inside which a camera module, an exposure parameter obtaining module, a storage unit module, a smart control module, a target illumination level module, an illumination level calculation module, an illumination product connection module and a setting terminal connection module are provided, wherein:

the camera module is used to intermittently or continuously shoot and monitor a target scene, thereby obtaining a current image;

the exposure parameter obtaining module is used to obtain an exposure parameter of the current image; the storage unit module is used to store the light meter described above and the set target illumination level;

the setting terminal connection module is used to receive control information of the smart control module and connect and transmit data wiredly or wirelessly to the setting terminal, the data comprising a position parameter of the target scene and a target illumination level setting parameter;

the target illumination level module obtains a target illumination level according to the target illumination level setting parameter received by the setting terminal connection module, and according to the method described above;

the illumination level calculation module is used to acquire a region range of a target scene from the smart control module, calculate an image perceiving illumination level within the region range of the target scene for the current image collected by the camera module, and calculate a current illumination level of a target scene for the image collected by the camera module through "the light meter" stored in "the storage unit module" by combining or not combining the exposure parameter of "the exposure parameter obtaining module";

the smart control module is used to:

1) calculate a region range of a target scene according to the position parameter of the target scene received by the setting terminal connection module and the current image collected by the camera module;

2) store the target illumination level obtained by the target illumination level module in the storage unit module; and 3) according to the current illumination level of the target scene obtained by the illumination level calculation module and the target illumination level stored in the storage unit module, calculate a deviation between the current illumination level and the target illumination level; increase a control parameter of an illumination level when the current illumination level is lower than the target illumination level; and decrease the control parameter of the illumination level and transmit the control parameter to the illumination product through the illumination product connection module when the current illumination level is higher than the target illumination level; and     the illumination product connection module is used to receive control information of the smart control module, and connect and transmit data wiredly or wirelessly to the illumination product.

When a plurality of cameras are set in a scene, the above camera further comprises a multi-camera connection module, the multi-camera connection module being used to receive the control information of the smart control module, and connect and transmit data wiredly or wirelessly to other camera. Moreover, according to the method described above, the current illumination level obtained by the other camera is transmitted to the target illumination level module for participating in adjustment of the target illumination level.

The smart illumination control system in the present invention comprises an illumination product, a setting terminal and the above camera. The camera and the illumination product are connected in a wired or wireless manner to evaluate a current illumination level of a target scene and automatically adjust an illumination level of an illumination product in the target scene according to a deviation between the current illumination level and the target illumination level; and the setting terminal is used to set one or more target scenes, associate each target scene with one or more illumination products and set the target illumination level.

The camera, the illumination product and the setting terminal are connected in a wired or wireless manner, thereby realizing constant control over the illumination level in the environment. A constant light environment and an illumination product having a high color rendering property can also provide long-term light environment closer to natural light for a shooting scene. Wherein the wireless manner comprises BlueTooth, Zigbee, wifi or Sub-1G.

When connection is made in a different wireless manner, data format conversion and connection can be performed through a gateway. The setting terminal can be a mobile phone, a tablet PC, a palm computer, a desktop computer, a smart television, a smart set top box or a visible digital speaker.

Figure 5:
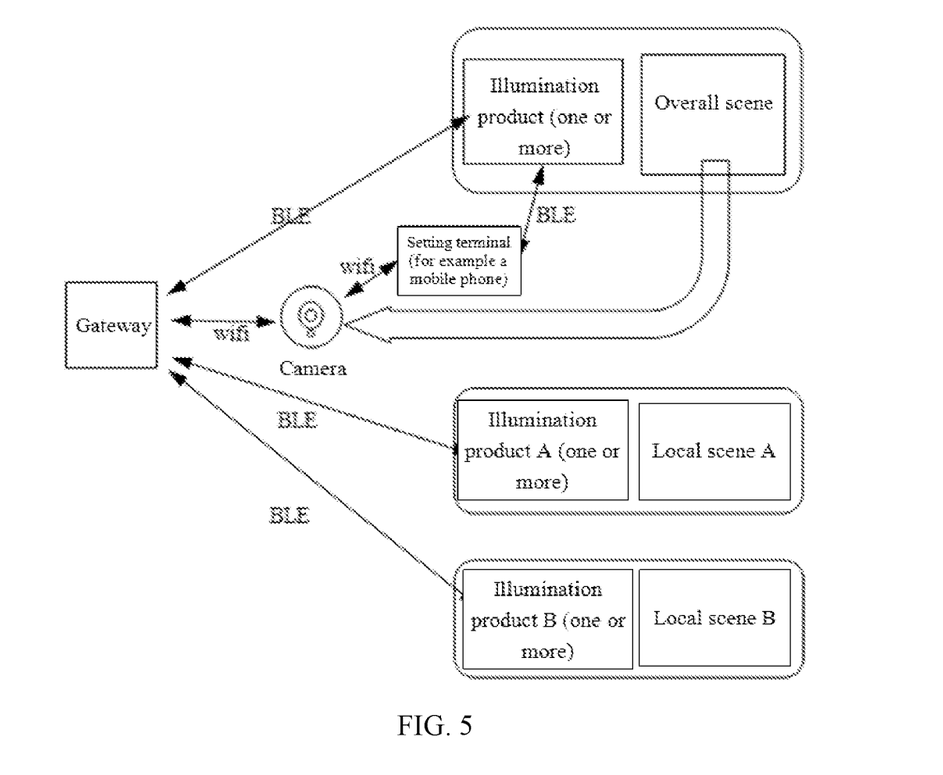
FIG. 5 is a block diagram of a composition of a smart illumination control system in one embodiment of the present invention, with wifi and BLE connection manners as examples.

What is shown in FIG. 5 is one embodiment of a smart illumination control system of the present invention, with wifi and BLE connection manners as examples. The system shown in the figure comprises an illumination product, a setting terminal (for example a mobile phone), a gateway and the above camera. The illumination product adopts BLE wireless connection, the camera adopts wifi wireless connection, data format conversion and interconnection of wifi-BLE is performed through a gateway between the camera and the illumination product, and the camera and the illumination product are at an online state. The camera shoots an overall scene and the user can set one or more target scenes on a mobile phone.

As shown in FIG. 5, the overall scene shot by the camera can be set as the target scene and a partial scene (for example local scene A and/or local scene B in the drawing) in the overall scene can also be specified as the target scene through the mobile phone and other setting terminal. A position parameter of the target scene on the mobile phone is transmitted to the camera through wifi connection, and the camera calculates a region range of the target scene according to the received position parameter set by the user for subsequent calculation of the illumination level.

After the overall scene, the local scene A and the local scene B are determined as the target scene, the overall scene is associated with one or more illumination products through the mobile phone; the local scene A is associated with one or more illumination products A; and the local scene B is associated with one or more illumination products B.

For the target illumination level of the target scene set by the user on the mobile phone, the default value of the system can be adopted or it can also be set in a self-defined manner. When the user adopts the scene interaction setting function, the user can adjust an illumination level in a target scene by a user through natural light or adjustment of lamps or other manners, and when the illumination level in the target scene reaches an expectation of the user, the user confirms a current illumination level in the target scene collected by the camera on the mobile phone and takes the illumination level in the scene at this time as a target illumination level.

In the process of automatically adjusting the illumination level, the camera continuously shoots the target scene, thereby obtaining an original image and an exposure parameter and other information of the target scene, and calculating a current illumination level of the target scene on a real time basis according to the method described above. Moreover, according to a deviation between the current illumination level and the target illumination level, the illumination product associated with the target scene is adjusted on a real time basis, such that the illumination level of the target scene is maintained to the target illumination level.

Another embodiment of the smart illumination control system in the present invention involves that the illumination product automatically supplements light for the camera shooting. Too dark light of the camera is easy to cause underexposure and too bright light of the camera is easy to cause overexposure. By linking the illumination product to the camera, the target illumination level for the camera shooting is set at the setting terminal (for example a mobile phone). According to a real time illumination level in the target scene, one or more illumination products associated with the target scene automatically adjust light, thus realizing constant light control over the shooting of the camera. The illumination product can be equipped with a higher color rendering index, capable of providing light conditions with higher color rendition for the shooting.

What is claimed is:

1. A camera, comprising a camera body, wherein a storage, an illumination product connection, and a setting terminal connection are provided inside the camera body,
    the camera intermittently or continuously shoots and monitors a target scene to obtain a current image, and obtains an exposure parameter of the current image;
    the storage stores a light meter and a target illumination level set through a self-defined calculation;
    the setting terminal connection receives control information and connects and transmits data to a setting terminal in a wired or wireless manner, the data comprising a position parameter of the target scene and a target illumination level setting parameter;
    the camera obtains the target illumination level according to the target illumination level setting parameter received by the setting terminal connection through the self-defined calculation;
    the camera acquires a region range of the target scene, calculates an image perceiving illumination level within the region range of the target scene for the current image collected, and calculates a current illumination level of the target scene for the current image collected through the light meter stored in the storage by combining or not combining the exposure parameter;
    wherein the camera is further configured to:
    1) Calculate the region range of the target scene according to the position parameter of the target scene received by the setting terminal connection and the current image collected;
    2) Store the target illumination level obtained in the storage; and
    3) According to the current illumination level of the target scene obtained and the target illumination level stored in the storage, calculate a deviation between the current illumination level and the target illumination level; increase a control parameter of an illumination level when the current illumination level is lower than the target illumination level; and decrease the control parameter of the illumination level and transmit the control parameter to an illumination product through the illumination product connection when the current illumination level is higher than the target illumination level; and
    the illumination product connection is used to receive the control information, and connect and transmit the data to the illumination product in the wired or wireless manner.

2. The camera according to claim 1, further comprising a multi-camera connection, wherein the multi-camera connection is used to receive the control information.

3. A smart illumination control system, comprising an illumination product, a setting terminal, and the camera of claim 1,
    wherein the camera and the illumination product are connected in the wired or wireless manner to evaluate the current illumination level of the target scene and automatically adjust the illumination product associated with the target scene according to the deviation between the current illumination level and the target illumination level; and
    the setting terminal is used to set one or more target scenes, associate each target scene with one or more illumination products and set the target illumination level.

4. The smart illumination control system according to claim 3, wherein the camera, the illumination product and the setting terminal are connected in the wired or wireless manner, the wireless manner comprising BlueTooth, Zigbee, wifi or Sub-1G.

5. The smart illumination control system according to claim 4, wherein when the camera, the illumination product and the setting terminal are connected in a different wireless manner, a data format conversion and a connection are performed through a gateway.

6. The smart illumination control system according to claim 3, wherein the setting terminal is a mobile phone, a tablet PC, a palm computer, a desktop computer, a smart television, a smart set top box or a visible digital speaker.

7. The smart illumination control system according to claim 3, wherein the target illumination level is set at the setting terminal and automatic light supplementing for the camera is performed by adjusting an illumination level through the illumination product, and constant light control over a shooting of the camera is realized.

\* \* \* \* \*